(12) United States Patent
Martens et al.

(10) Patent No.: US 9,324,356 B2
(45) Date of Patent: Apr. 26, 2016

(54) OPTICAL DATA STORAGE MEDIUM AND USE OF SUCH MEDIUM

(75) Inventors: Hubert Cécile François Martens, Eindhoven (NL); Ronald Joseph Antonius Van Den Oetelaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1132 days.

(21) Appl. No.: 10/517,917

(22) PCT Filed: Jun. 13, 2003

(86) PCT No.: PCT/IB03/02832
§ 371 (c)(1),
(2), (4) Date: Dec. 14, 2004

(87) PCT Pub. No.: WO03/107334
PCT Pub. Date: Dec. 24, 2003

(65) Prior Publication Data
US 2005/0174924 A1 Aug. 11, 2005

(30) Foreign Application Priority Data
Jun. 18, 2002 (EP) ..................................... 02077448

(51) Int. Cl.
*G11B 7/24* (2013.01)
*G11B 7/0045* (2006.01)
(Continued)

(52) U.S. Cl.
CPC ............ *G11B 7/00455* (2013.01); *G11B 7/007* (2013.01); *G11B 7/0052* (2013.01); *G11B 7/24* (2013.01)

(58) Field of Classification Search
USPC ......................................... 369/275.4, 288, 94
See application file for complete search history.

(56) References Cited

U.S. PATENT DOCUMENTS 5,581,539 A 12/1996 Horie et al.
5,764,619 A * 6/1998 Nishiuchi et al. .......... 369/275.1
(Continued)

FOREIGN PATENT DOCUMENTS

EP 0957477 A2 11/1999
EP 1067535 A2 1/2001
(Continued)

OTHER PUBLICATIONS

Nagata K, et.al. Rewritable Duel-Layer Phase-Change Optical Disk; vol. 38; No. 3B, Mar. 1999 pp. 1679-1686.

*Primary Examiner* — Adam R Giesy
*Assistant Examiner* — Henok Heyi

(57) ABSTRACT

A multi-stack optical data storage medium (30) for recording and reading using a focused radiation beam (40) entering through an entrance face (41) of the medium (30) is described. It has a first substrate (31a) with present on a side thereof a first recording stack (33) named $L_0$, comprising a recordable type $L_0$ recording layer (35), formed in a first $L_0$ guide groove (38a, 38b). A first reflective layer (39) is present between the first L0 recording layer (35) and the first substrate (31a). A second substrate (31b) with present on a side thereof a second recording stack (32) named $L_1$ is present at a position closer to the entrance face (41) than the $L_0$ recording stack (33) and formed in a second $L_1$ guide groove (37). A transparent spacer layer (36) is sandwiched between the recording stacks (32, 33). The first $L_0$ guide groove (38a, 38b) has a depth $G_{L0} < 100$ nm. In this way a relatively high reflection value of the L0 stack is achieved at a radiation beam wavelength of approximately 655 nm.

11 Claims, 5 Drawing Sheets

Figure 1:
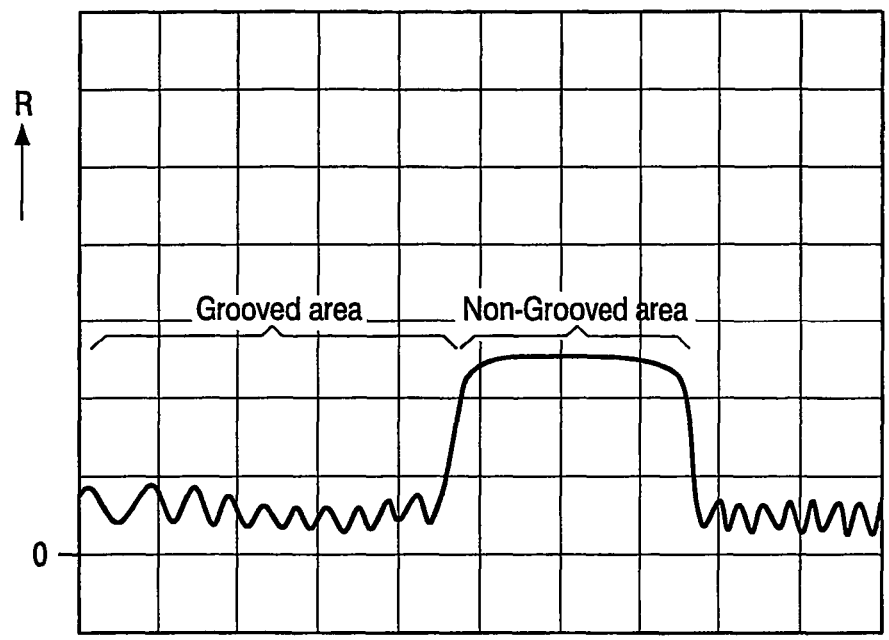

(51) Int. Cl.
*G11B 7/005* (2006.01)
*G11B 7/007* (2006.01)

(56) References Cited

U.S. PATENT DOCUMENTS

| | | | |
|---|---|---|---|
| 5,981,059 A * | 11/1999 | Bright et al. | 428/336 |
| 6,021,109 A | 2/2000 | Spruit et al. | |
| 6,221,455 B1 * | 4/2001 | Yasuda et al. | 428/64.1 |
| 6,246,656 B1 | 6/2001 | Kawakubo et al. | |
| 7,166,360 B2 * | 1/2007 | Coustet et al. | 428/432 |
| 2001/0038603 A1 | 11/2001 | Kondo et al. | |
| 2002/0006105 A1 * | 1/2002 | Usami | 369/275.4 |
| 2002/0060978 A1 | 5/2002 | Hirotsune et al. | |
| 2002/0099204 A1 * | 7/2002 | Wolleb et al. | 540/140 |
| 2002/0106475 A1 * | 8/2002 | Mihara et al. | 428/64.4 |
| 2002/0146875 A1 * | 10/2002 | Yamaguchi et al. | 438/200 |
| 2002/0160306 A1 * | 10/2002 | Hanaoka et al. | 430/270.13 |
| 2003/0039200 A1 * | 2/2003 | Shintani et al. | 369/275.1 |
| 2003/0053403 A1 * | 3/2003 | Miyamoto et al. | 369/275.3 |
| 2003/0185143 A1 * | 10/2003 | Lin et al. | 369/275.4 |
| 2006/0067197 A1 * | 3/2006 | Mizushima et al. | 369/116 |

FOREIGN PATENT DOCUMENTS

| | | |
|---|---|---|
| EP | 1067535 A9 | 1/2001 |
| EP | 1126446 A2 | 8/2001 |
| EP | 1067535 A3 | 1/2002 |
| EP | 1174869 A2 | 1/2002 |
| EP | 0957477 A3 | 11/2003 |
| JP | 2000260059 A | 9/2000 |
| JP | 2000268409 A | 9/2000 |
| JP | 2000311384 A | 11/2000 |
| JP | 2001126309 A | 5/2001 |
| JP | 2001344810 A | 12/2001 |
| KR | 20010090164 A | 10/2001 |
| WO | 03060894 A1 | 7/2003 |
| WO | 03083845 A1 | 10/2003 |

* cited by examiner

OPTICAL DATA STORAGE MEDIUM AND USE OF SUCH MEDIUM

The invention relates to a multi-stack optical data storage medium for recording and reading using a focused radiation beam entering through an entrance face of the medium during recording and reading, comprising:
- a first substrate with present on a side thereof:
- a first recording stack named $L_0$, comprising a recordable type $L_0$ recording layer, and formed in a first $L_0$ guide groove, and a first reflective layer present between the $L_0$ recording layer and the first substrate,
- a second substrate with present on a side thereof:
- a second recording stack named $L_1$ comprising a recordable type $L_1$ recording layer, said second recording stack being present at a position closer to the entrance face than the $L_0$ recording stack and formed in a second $L_1$ guide groove,
- a transparent spacer layer sandwiched between the recording stacks, said transparent spacer layer having a thickness substantially larger than the depth of focus of the focused radiation beam;

The invention also relates to the use of such a medium.

An embodiment of an optical recording medium as described in the opening paragraph is known from European Patent Application EP1067535A2. Normally the medium is in the form of a circular disk.

Regarding the market for optical recording, it is clear that the most important and successful format so far is a write-once format, Compact Disc recordable (CD-R). Although the take-over in importance by Compact Disc Rewritable (CD-RW) has been predicted since a long time, the actual market size of CD-R media is still at least an order of magnitude larger than for CD-RW. Furthermore the most important parameter for drives is the maximum write speed for R-media, not for RW. Of course, a possible shift of the market to CD-RW is still possible, e.g. because of Mount Rainier for CD-RW. However, the R-format has been proven very attractive due to its 100% compatibility.

Next to the Digital Versatile Disc ReWritable (DVD+RW) standard recently a new Digital Versatile Disc Recordable (DVD+R) standard was developed. The new DVD+R standard gets increasing attention as an important support for DVD+RW. A possible scenario is that the end customers have become so familiar with an optical write-once format that they might accept it more easily than a re-writable format.

An issue for both the R and RW formats is the limited capacity and therefore recording time because only single-stacked media are present. Note that for DVD-Video, dual stacked media have a considerable market share. A dual-layer, i.e. dual stack, DVD+RW disk is probably feasible. However, it has become clear that a fully compatible disk, i.e. within the reflection and modulation specification of the dual-layer DVD-ROM, is very difficult to achieve and requires at least a major breakthrough for the phase-change material properties. Without a full compatibility, the success of a dual-layer DVD+RW in the market is questionable.

In order to obtain a dual-layer DVD+R medium which is compatible with the dual-layer DVD-ROM standard, the effective reflectivity of both the upper $L_1$ layer and the lower $L_0$ layer should be at least 18% at a radiation beam wavelength of approximately 655 nm. Effective means that the reflection is measured as the portion of effective light coming back from the medium when both stacks $L_0$ and $L_1$ are present and focusing on $L_0$ and $L_1$ respectively. This means that the $L_0$ stack as such requires a far higher reflection level of e.g. more than 50%, preferably more than 60%, because the $L_1$ stack absorbs a substantial portion of the incoming and outgoing light. It should be noted that in this document the normally used convention of notation of $L_0$ and $L_1$, in which notation $L_0$ is the "closest" stack, i.e. closest to the radiation beam entrance face, has been changed: $L_0$ now is the deepest stack and $L_1 \ldots L_n$ are stacks closer to the radiation beam entrance face. In EP1067535A2 the following definitions are used: DG1 is the thickness of the dye layer in groove of the first information recording/reproduction unit which corresponds to $L_1$, dG2 is the thickness of the dye layer in groove of the second information recording/reproduction unit which corresponds to $L_0$. DL1 is the thickness of the dye layer on land corresponding to $L_1$, dL2 is the thickness of the dye layer on land corresponding to $L_0$. The depth of the grooves corresponding to $L_1$ is d1 but the depth of the grooves d2 corresponding to $L_0$ is defined differently. D2 is the height difference of lands and grooves measured on the dye surface after a dye layer has been coated. DG2, d2 and dL2 are set to approximately 174, 140 and 120 nm. A calculation shows that this corresponds to a groove depth g in the substrate corresponding to $L_0$ of about 194 nm. Measurements by applicants have shown that the inverted $L_0$ stack of the known medium with grooves with a depth of 194 mm has a reflectivity being only 15%-50% of the reflectivity of blank areas (i.e. without grooves). This means that it is impossible to reach the desired 60% reflection level because in order to obtain a dual-layer DVD+R medium which is compatible with the dual-layer DVD-ROM standard, the reflectivity of a light beam focused onto the data track of the lower $L_0$ layer should be sufficiently high (typically >60%, depending on the transmission of the upper $L_1$ layer). From a dual-stack DVD+R production point of view, an inverted $L_0$ layer structure is preferred which means that the recording layer of the $L_0$ stack is present at a side of the reflective layer other than the side of the substrate with groove structure.

It is an object of the invention to provide an optical data storage medium of the type mentioned in the opening paragraph which has a reflection value of the $L_0$ recording stack higher than 25%, preferably higher than 50%, at a radiation beam wavelength of approximately 655 nm.

This object has been achieved in accordance with the invention by an optical storage medium as described in the opening paragraph, which is characterized in that the first $L_0$ guide groove has a depth $G_{L0}$<100 nm. This invention discloses proposes the use of shallow grooves in order to achieve a high reflection value. According to calculations grooves deeper than 200 nm may also achieve a high reflection but are more difficult to manufacture from the point of view of mastering and injection molding. The explanation for the reduced reflection above 100 nm may be that grooves covered with metal act as a waveguide for the radiation beam, thereby lowering the effective reflectivity due to optical effects, e.g. changes in polarization. At depths >200 nm these effects may again lead to an increase of the reflection.

In an embodiment $G_{L0}$<80 nm and the first $L_0$ guide groove has a full half maximum width $W_{L0}$<350 nm. For grooves which have a width of smaller than 350 nm the groove depth should be smaller than 80 nm. When grooves are relatively wide, e.g. 500-600 nm, groove depths of close to 100 nm may be feasible with still enough reflection. At smaller groove widths wave guide like effects play a more prominent role and the effective reflectivity may decrease. The shallow groove depth will result in inversion of the radial-error signal (push pull) and of the wobble signal. This should be corrected for in the drive.

In another embodiment 25 nm<$G_{L0}$<40 nm and the first reflective layer comprises a metal and has a thickness >50 nm.

A very high reflection value is obtained by which compatibility with the DVD-dual layer read only, i.e. video and ROM, standard is achieved. Without additional measures the reduced groove depth seems to have a relatively low optical modulation, i.e. optical contrast between mark and non-mark. For e.g. a 35 nm deep groove experiments showed a modulation of 10%, both on land and groove.

In a further embodiment recordable type $L_0$ recording layer comprises a dye and has a thickness between 70 nm and 150 nm measured on the land portion of the guide groove. When using this thickness range adequate mark formation in the dye layer is achieved. When using this stack good modulation is possible combined with the strongly reduced groove depth. As the recording is performed on land, as opposed to in-groove, a proper sign of the modulation, i.e. high to low recording, is achieved. This has the additional advantage that the push-pull signal has the proper sign and no measures in the optical disk drive are required to invert the push-pull sign.

A dielectric layer may be present at a side of the $L_0$ recording layer opposite from the side where the first reflective layer is present. This has the advantage of even a better modulation. The dielectric layer preferably has a thickness in the range of 5 nm-120 nm.

In yet another embodiment a second reflective layer comprising a metal is present at a side of the $L_0$ recording layer opposite from the side where the first reflective layer is present. Preferably the second reflective layer has a thickness in the range of 5 nm-15 nm. The second reflective layer preferably mainly comprises a metal selected from the group of Ag, Au, Cu, Al. The second reflective layer has the advantage of an even higher reflection of the $L_0$ stack. Small variations in stack design may be required to reach good recording performance.

An additional advantage of the use of shallow grooves in an inverted $L_0$ stack is that a wobble of the guide groove is less visible in the reflection of the radiation beam. A wobble is used to modulate additional information in the guide groove, e.g. an address or time signal. When e.g. using a guide groove with a depth $G_{L0}$ of 160 nm a variation of 15% is visible in the signal with the same periodicity as the wobble. At a groove depth $G_{L0}$ of 35 nm this variation is substantially absent.

Figure 2:
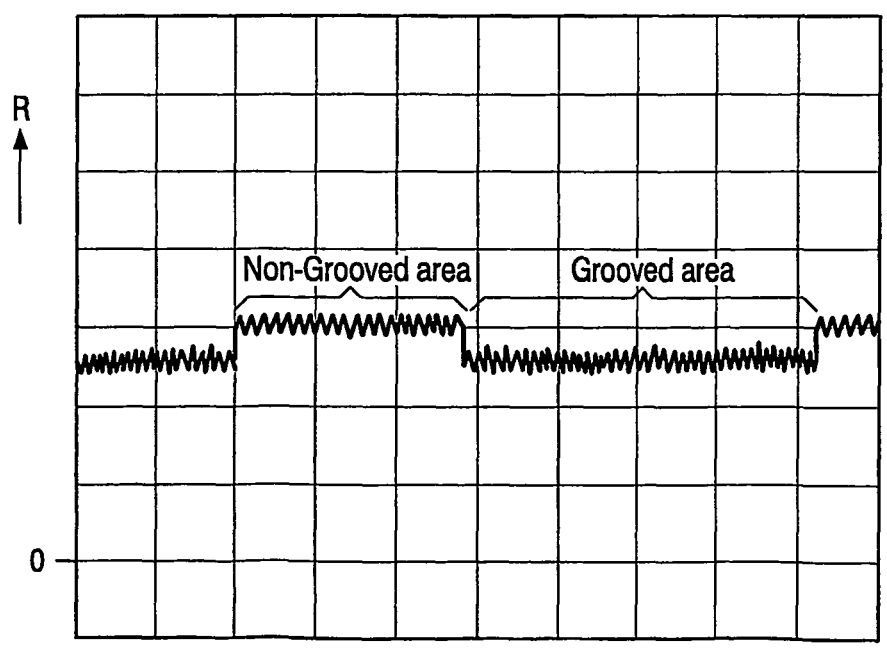
Figure 3:
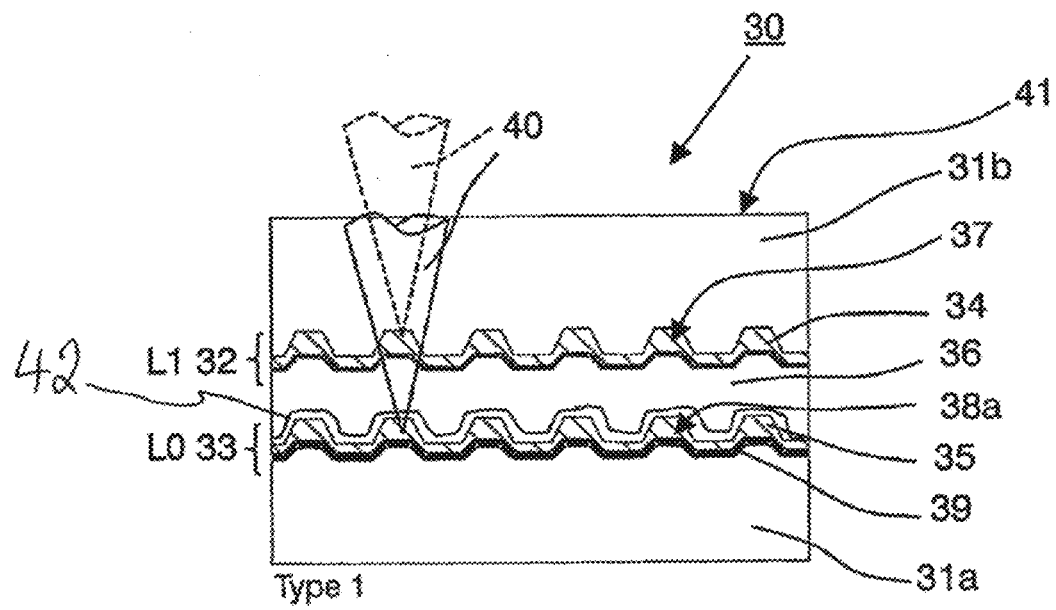
Figure 4:
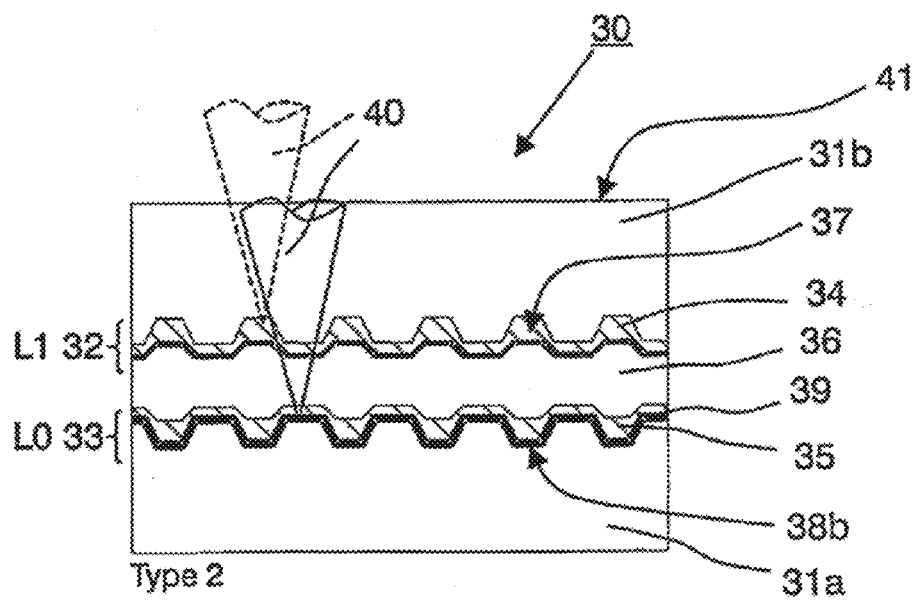
Figure 5A:
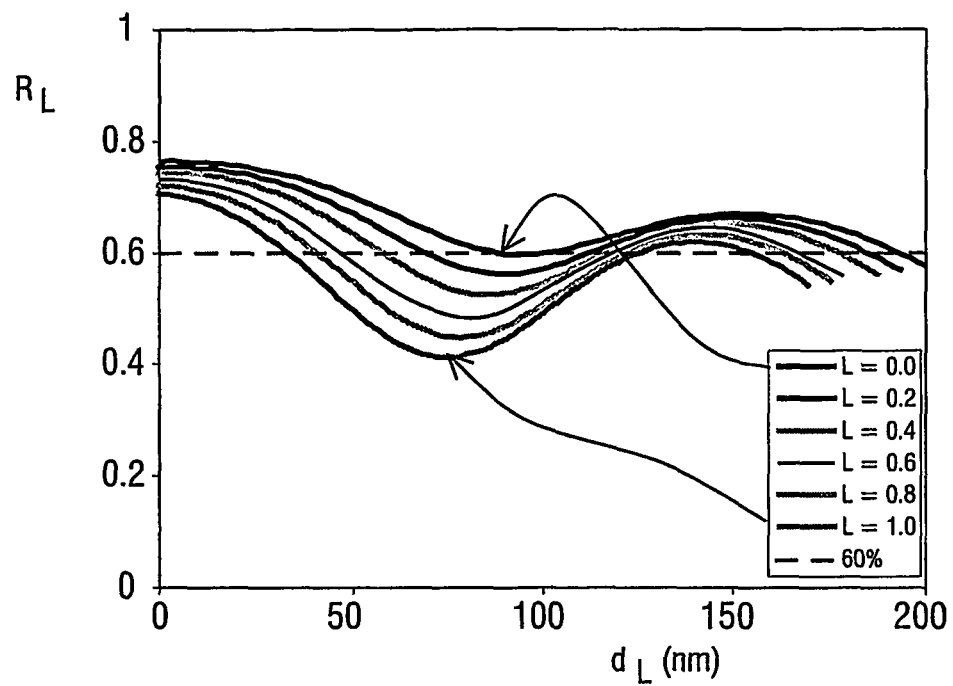
Figure 5B:
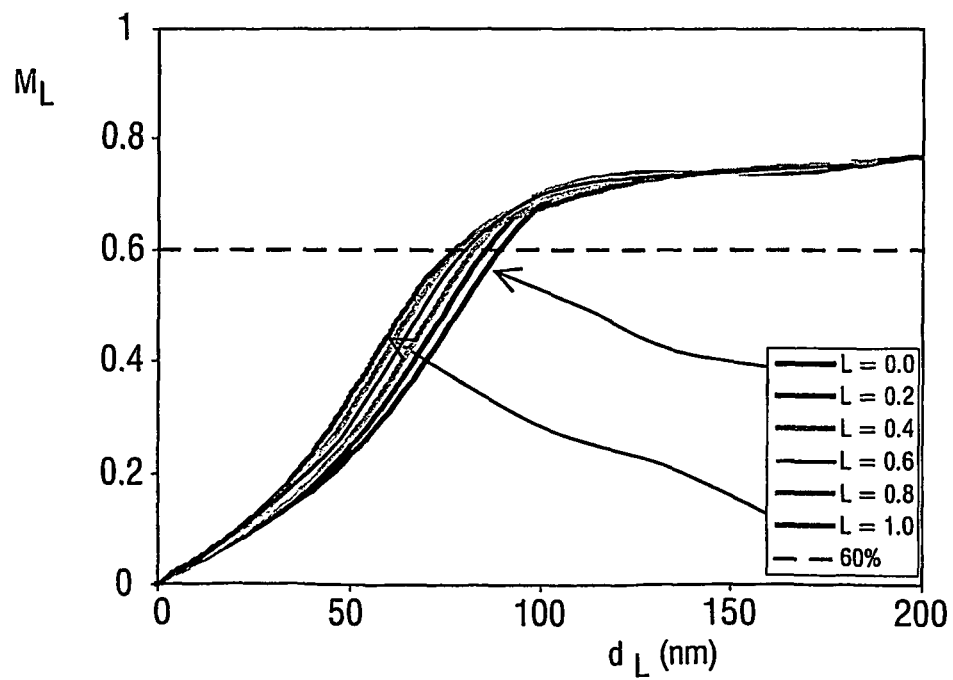
Figure 6A:
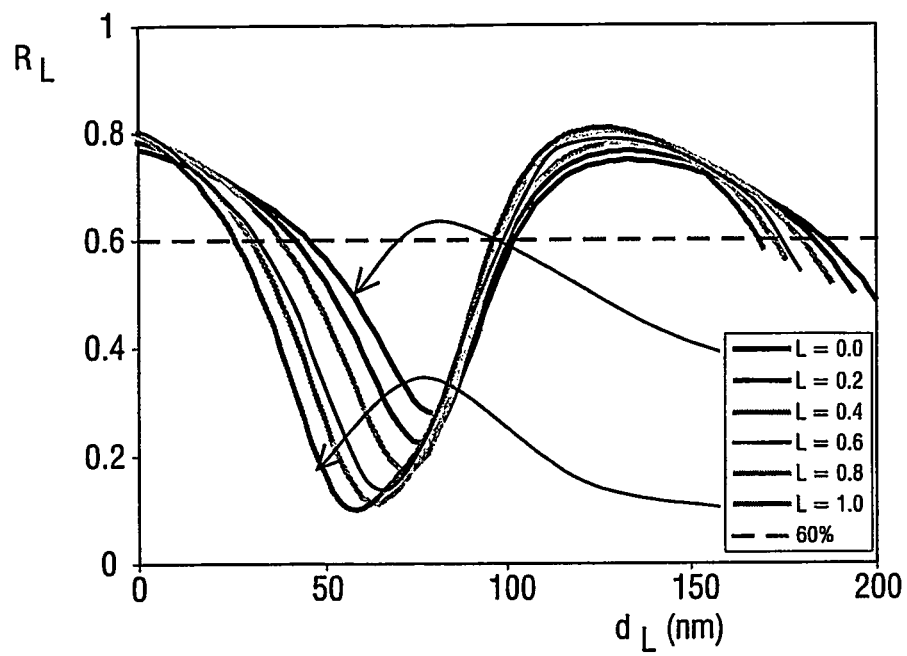
Figure 6B:
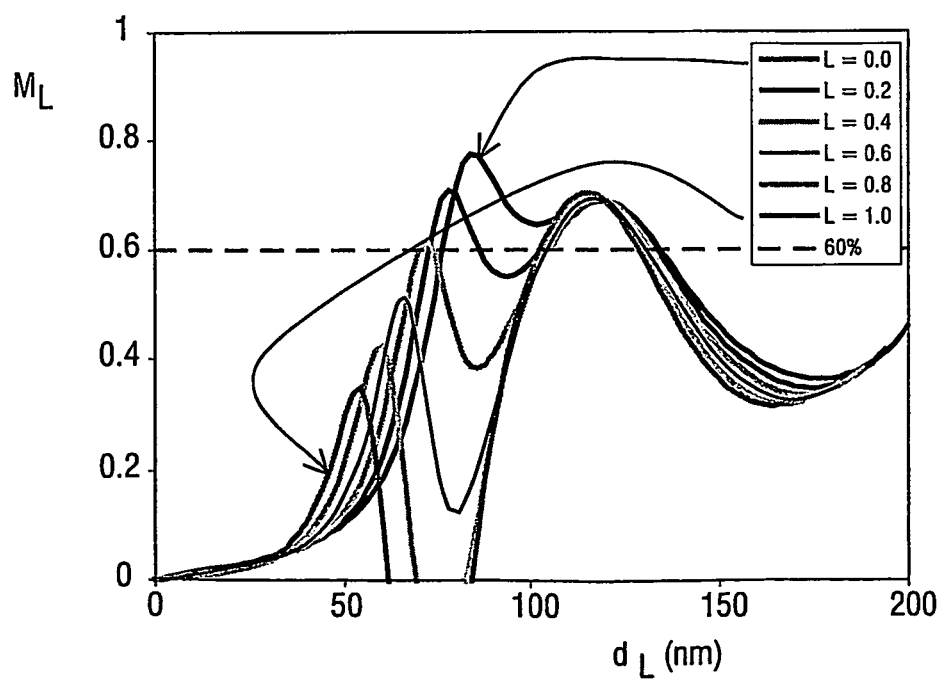

The invention will be elucidated in greater detail with reference to the accompanying drawings, in which FIG. 1 shows the reflectivity on a blank area (mirror) and grooved area for an inverted $L_0$ DVD+R stack. The groove depth is 126 nm. The reflectivity on the grooved area is only about 15% of the reflectivity on the blank area, FIG. 2 shows the reflectivity on a blank area (mirror) and grooved area for an inverted $L_0$ DVD+R stack. The groove depth is 35 nm. The reflectivity on the grooved area is approximately 85% of the reflectivity on the blank area, FIG. 3 schematically shows a cross-section of an embodiment according to the invention, FIG. 4 schematically shows a cross-section of an embodiment according to the invention for an inverted $L_0$ stack, FIGS. 5a and 5b show the calculated result of a modeling study of a stack design according to the invention, FIGS. 6a and 6b show the calculated result of a modeling study of another stack design according to the invention, FIG. 7 Reflection and modulation calculated for a reference disk: single-layer DVD+R.

In FIG. 1 the results of experiments on inverted $L_0$ DVD+R stacks are presented when a substrate with a groove depth $G_{L0}$ of 126 nm, not according to the invention, was used. The reflectivity on the grooved area is approximately 15% of the reflectivity on the blank area (mirror). This value is not acceptable.

In FIG. 2 the results of experiments on inverted $L_0$ DVD+R stacks are shown. A DVD+RW substrate with a groove depth of about 35 nm, according to the invention, was used. The reflectivity on the grooved area is approximately 85% of the reflectivity on the blank area, which is significantly higher than for deeper grooves. The disk still shows sufficient push-pull signal, so tracking is possible. Also the experiments show that it is possible to write data, although the modulation appears to be relatively low (10%, 11T carrier to noise ratio CNR ~30 dB) but with the stack design of FIG. 5 and FIG. 6 a high modulation is possible.

The $L_0$ substrate 31a had 35 nm deep grooves with a FWHM width $W_{L0}$ of 300 nm, a reflective layer 39 of 100 nm Ag, and 80 nm azo dye recording layer 35, and a protective layer. Typical dyes that can be used are (phthalo)cyanine-type, azo-type, squarylium-type, pyrromethene-type or other organic dye material having the desired properties.

In FIG. 3 a multi-stack optical data storage medium 30 for recording is shown. A focused radiation beam, i.e., a laser beam 40 with a wavelength of about 655 nm, enters through an entrance face 41 of the medium 30 during recording. The medium comprises a first substrate 31a with present on a side thereof a first recording stack 33 named $L_0$, comprising a recordable type $L_0$ recording layer 35, i.e. an azo dye. The $L_0$ recording layer is formed in a first $L_0$ guide groove 38a, and a first reflective layer 39 is present between the $L_0$ recording layer 35 and the first substrate 31a. A dielectric layer 42 may be present at a side of the $L_0$ recording layer opposite from the side where the first reflective layer is present. This has the advantage of even a better modulation. The dielectric layer preferably has a thickness in the range of 5 nm-120 nm. A second substrate 31b is present with on a side thereof a second recording stack 32 named $L_1$ comprising a recordable azo dye type $L_1$ recording layer 34. The second recording stack $L_1$ 32 is present at a position closer to the entrance face 41 than the $L_0$ recording stack 33 and formed in a second $L_1$ guide groove 37.

A transparent spacer layer 36 is sandwiched between the recording stacks 32, 33 and has a thickness of approximately 40 µm. The first $L_0$ guide groove 38a has a depth of 35 nm. Note that the depth of the guide groove is defined at the position of the semi reflective layer present between 34 and 36. The medium may be manufactured as follows. The spacer 36 either contains the first guide groove, also called pre-groove, for $L_0$ or this first guide groove for $L_0$ is mastered into the spacer after application of it to $L_1$. Normally the guide groove constitutes a spiral. Then the first recording stack $L_0$ is deposited on the grooved spacer 36. Finally, the first substrate 31a, containing no grooves, is applied. This lay-out is called type 1.

In FIG. 4 a variant of the medium 30 is shown called type 2. Type 2 is based on an inverted $L_0$ stack, and is the preferred embodiment. The description of FIG. 3 applies with the exception that a guide groove 38b now is present in the first substrate 31a. This first substrate 31a with $L_0$ is attached to the substrate with $L_1$ with the transparent spacer layer 36 in between. Specific suitable $L_0$ stack designs named stack 1, stack 2 and stack 3 are discussed elsewhere in this document with the description of FIG. 5 and FIG. 6. The preferred spacer-layer thickness for both disk types is 40 µm to 70 µm. One specific embodiment would be:

$L_1$: 80 nm dye/12 nm Ag/UV curable resin (protective layer) and $L_0$: 100 mm (ZnS)80(SiO2)20/130 nm dye/100 nm Ag, and a spacer thickness of 55 µm. The effective reflection from $L_1$ is 20%, and the effective reflection (measured through $L_1$) from $L_0$ is 21% at a radiation beam wavelength of approximately 655 nm.

The upper $L_1$ stack of a recordable dual-stack DVD disk should have high transparency in order to be able to address the lower lying $L_0$ stack. At the same time, $L_1$ preferably should have a reflectivity of at least 18% in order to meet the dual layer DVD-ROM specification. The stacks proposed here are not restricted to use in DVD+R-DL and can be applied in any (multi-stack) organic-dye based optical recording medium.

In FIGS. 5a and 5b modeling results are presented on a stack with the following design:

Stack 1:
   25 to 40 nm deep guide grooves in substrate 31a,
   an optically closed Ag mirror of 100 mm. Other metals, e.g. Au, Cu or Al, may be used as well,
   an azo dye layer, with thickness of 130 nm on land, the refractive index of the dye is 2.24-0.02 i ($\lambda$=655 nm) which corresponds to a typical DVD recordable dye,
   80 to 120 nm $(ZnS)_{80}(SiO_2)_{20}$, other dielectrics with n~2.1 give identical results.

This design combines a high reflectivity and a high modulation of the inverted $L_0$ recording stack for the case of shallow grooves. The stacks should be recorded on-land (as opposed to in-groove) in order to obtain the proper sign of the modulation (high-to-low recording). This has as an additional advantage that the push-pull signal has the proper sign ("on-land"). The parameter L is defined as: $L=(d_G-d_L)/G$ in which formula $d_G$ is the dye thickness in the groove, $d_L$ is the dye thickness on land and G is the groove depth. This parameter is a measure for the leveling out of the dye after depositing on the groove structure. Normally, dye is deposited by spincoating and typically the leveling is between about 0.2 and 0.5. L=0 means that $d_G=d_L$ and L=1 means that the top surface of the dye is completely flat after depositing on the guide groove structure. In FIG. 5a the calculated results of the on-land reflection at a radiation beam wavelength of 655 nm as a function of the onland dye thickness $d_L$ are shown. In FIG. 5b the calculated results of on land modulation as a function of the on land dye thickness $d_L$ are shown. The horizontal dotted line indicates a minimum desired level. It can be noted that the desired level is reached at a dye thickness range of about 70-150 nm.

Experimental results obtained with this stack 1 are: A high modulation of 75% and a high reflection level of 70%. Modulation is generally defined as $M=(R_{no-mark}-R_{mark})/R_{no-mark}$ in which formula $R_{mark}$ and $R_{no-mark}$ are the reflection levels from the read out laser beam when respectively a written mark and no mark is present. The laser beam power required to write in the $L_0$ layer is only 7 mW, which is favorable in view of the presence of the $L_1$ stack because a relatively large portion of the power will be absorbed in the $L_1$ stack.

In FIGS. 6a and 6b modeling results are presented on a stack with the following design:

Stack 2:
   25 to 40 nm deep guide grooves in substrate 31a,
   an optically closed Ag reflective layer 39 of 100 nm, other metals, e.g. Au, Cu or Al, may be used as well,
   an azo dye layer, thickness 100 to 130 nm on land, the refractive index of the dye is 2.24-0.02 i which corresponds to a typical dye,
   a 5 to 15 nm second reflective layer of Ag, other metals, e.g. Au, Cu or Al, may be used as well.

The on land reflection $R_L$ and on land modulation $M_L$ are plotted as a function of the on land dye thickness $d_L$ for different leveling values L of the dye.

A third stack design is possible which is not shown in a drawing but is described here:

Stack 3:
   25 to 40 nm deep guide grooves in substrate 31a,
   an optically closed Ag reflective layer 39 of 100 nm, other metals, e.g. Au, Cu or Al, may be used as well,
   an azo dye layer 35, thickness 90 nm to 160 nm on land, the refractive index of the dye is 2.24-0.02 i which corresponds to a typical dye,
   a 5 to 50 nm layer of $SiO_2$, other dielectrics may be used as well.

Figure 7:
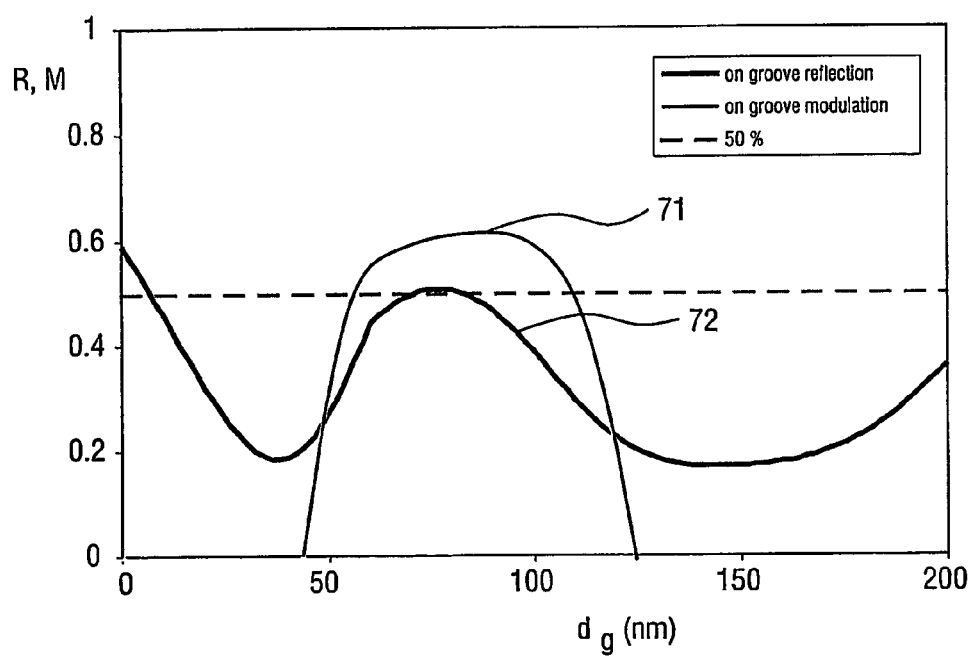

In FIG. 7, as an example, the result for a conventional single stack DVD+R disk is shown at a radiation beam wavelength of 655 mm. The refractive index of the dye is taken as 2.24-0.02 i ($\lambda$=655 nm). According to the calculations, when the dye has a thickness of around 80 nm in groove, both the on-groove reflection curve 72 and the on-groove modulation curve 71 are at optimum values. The calculated reflectivity and modulation agree well with experimentally obtained values. To achieve good signal quality from the $L_0$ layer, it was attempted to obtain stack designs that combine high reflectivity with a high modulation (both >60%). It turns out that for a straightforward three-layer stack-design, in-groove recorded signals have the wrong polarity (low-to-high recording, not shown) in most cases. Thus for the case of shallow grooves, on-land recording may be considered, or more complicated stack designs.

For both stack designs of FIG. 5 and FIG. 6 mentioned above, a dye thickness-range can be identified where both modulation and reflection are high. Note that the stacks proposed here, are optimized for shallow grooves.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention a multi-stack optical data storage medium for recording and reading using a focused radiation beam entering through an entrance face of the medium is described. It has a first substrate with present on a side thereof a first recording stack named $L_0$, comprising a recordable type $L_0$ recording layer, formed in a first $L_0$ guide groove. A first reflective layer is present between the first $L_0$ recording layer and the first substrate. A second substrate with present on a side thereof a second recording stack named $L_1$ is present at a position closer to the entrance face than the $L_0$ recording, stack and formed in a second $L_1$ guide groove. A transparent spacer layer is sandwiched between the recording stacks. The first $L_0$ guide groove has a depth $G_{L0}<100$ nm. In this way a relatively high reflection value of the $L_0$ stack is achieved at a radiation beam wavelength of approximately 655 nm.

The invention claimed is:

1. A multi-stack optical data storage medium for recording and reading using a focused radiation beam having a wavelength of 655 nm entering through an entrance face of the medium during recording and reading, comprising:
   a first substrate having, on a side thereof, a first recording stack $L_0$ comprising a recordable type $L_0$ recording layer comprising a dye, and formed in a first $L_0$ guide groove, and a first reflective layer present between the $L_0$ recording layer and the first substrate;

a second substrate having, on a side thereof, a second recording stack $L_1$ comprising a recordable type $L_1$ recording layer, said second recording stack $L_1$ being at a position closer to the entrance face than the first recording stack $L_0$ and formed in a second $L_1$ guide groove;

a transparent spacer layer sandwiched between the first and second recording stacks; and a dielectric layer present at a side of the $L_0$ recording layer opposite from the side where the first reflective layer is present, wherein the dielectric layer has a thickness in the range of 5 nm to 14 nm.

2. The multi-stack optical data storage medium as claimed in claim 1, wherein said multi-stack optical data storage medium further comprises a second reflective layer comprising a metal present at a side of the $L_0$ recording layer opposite from the side where the first reflective layer is present.

3. The multi-stack optical data storage medium as claimed in claim 2, wherein the second reflective layer has a thickness in the range of 5 nm-15 nm.

4. The multi-stack optical data storage medium as claimed in claim 2, wherein the metal is selected from the group of Ag, Au, Cu, Al.

5. The multi-stack optical data storage medium as claimed in claim 1, wherein the effective reflection level of the stacks is at least 0.18 at a radiation beam wavelength of approximately 655 nm.

6. The multi-stack optical data storage medium of claim 1, wherein the multi-stack optical data storage medium has a modulation M of 75% and a reflection level of 70%, and wherein the modulation is $M=(R_{no-mark}-R_{mark})/R_{no-mark}$, $R_{mark}$ and $R_{no-mark}$ being reflection levels from a read out laser beam when respectively a written mark and no mark are present.

7. The multi-stack optical data storage medium of claim 1, wherein a thickness of the spacer layer is between 40 μm to 70 μm.

8. The multi-stack optical data storage medium of claim 1, further comprising a third recording stack formed over the second recording stack $L_1$, wherein the third recording stack includes a third guide groove in the first substrate, the third guide groove having a thickness from 25 nm to 40 nm, a dye layer formed over the third guide groove and having a thickness from 90 nm to 160 nm, and a third reflective layer formed over the dye layer and having a thickness of 100 nm.

9. A multi-stack optical data storage medium for recording and reading using a focused radiation beam having a wavelength of 655 nm entering through an entrance face of the medium during recording and reading, comprising:

a first substrate having, on a side thereof, a first recording stack $L_0$ comprising a recordable type $L_0$ recording layer comprising a dye, and formed in a first $L_0$ guide groove, and a first reflective layer present between the $L_0$ recording layer and the first substrate, wherein the first $L_0$ guide groove has a width of $500<W_{L0}<600$ nm;

a second substrate having, on a side thereof, a second recording stack $L_1$ comprising a recordable type $L_1$ recording layer and a second reflective layer present at a side of the $L_0$ recording layer opposite from the side where the first reflective layer is present, said second recording stack $L_1$ being at a position closer to the entrance face than the first recording stack $L_0$ and formed in a second $L_1$ guide groove;

a transparent spacer layer sandwiched between the first and second recording stacks; and a dielectric layer present at a side of the $L_0$ recording layer opposite from the side where the first reflective layer is present, wherein the dielectric layer has a thickness in the range of 5 nm to 14 nm, and wherein the second reflective layer has a thickness in the range of 5 nm to 15 nm.

10. The multi-stack optical data storage medium of claim 9, wherein a thickness of the spacer layer is between 40 μm to 70 μm.

11. The multi-stack optical data storage medium of claim 9, further comprising a third recording stack formed over the second recording stack $L_1$, wherein the third recording stack includes a third guide groove in the first substrate, the guide groove having a thickness from 25 nm to 40 nm, a dye layer formed over the third guide groove and having a thickness from 90 nm to 160 nm, and a third reflective layer formed over the dye layer and having a thickness of 100 nm.

* * * * *